(12) United States Patent
Yoshikawa et al.

(10) Patent No.: US 12,543,939 B2
(45) Date of Patent: Feb. 10, 2026

(54) CATHETER INSERTER, CATHETER DEVICE

(71) Applicant: Japan Lifeline Co., Ltd., Tokyo (JP)

(72) Inventors: Daisuke Yoshikawa, Tokyo (JP); Yasuhiro Okawa, Tokyo (JP); Itsuki Nakagami, Tokyo (JP)

(73) Assignee: JAPAN LIFELINE CO., LTD., Tokyo (JP)

( * ) Notice: Subject to any disclaimer, the term of this patent is extended or adjusted under 35 U.S.C. 154(b) by 297 days.

(21) Appl. No.: 18/446,366

(22) Filed: Aug. 8, 2023

(65) Prior Publication Data

US 2024/0108205 A1   Apr. 4, 2024

(30) Foreign Application Priority Data

Sep. 29, 2022   (JP) ................................. 2022-156206

(51) Int. Cl.
*A61B 1/018* (2006.01)
*A61B 1/00* (2006.01)
*A61M 25/01* (2006.01)
*A61M 25/10* (2013.01)

(52) U.S. Cl.
CPC .......... *A61B 1/018* (2013.01); *A61B 1/00082* (2013.01); *A61M 25/01* (2013.01); *A61M 25/10* (2013.01)

(58) Field of Classification Search
CPC ............... A61F 2/958; A61M 25/0662; A61M 2025/0681; A61B 1/012–018
See application file for complete search history.

(56) References Cited

U.S. PATENT DOCUMENTS 5,545,209 A * 8/1996 Roberts ................. A61M 25/10
604/103.05
5,968,069 A * 10/1999 Dusbabek ............... A61F 2/958
604/96.01

(Continued)

FOREIGN PATENT DOCUMENTS

JP   2014124264 A   7/2014
JP   2002515305 A   5/2022

OTHER PUBLICATIONS

An Office Action in corresponding JP Application No. 2022-156206 dated Aug. 6, 2024, 2 pages.

*Primary Examiner* — Carolyn A Pehlke
(74) *Attorney, Agent, or Firm* — MUNCY, GEISSLER, OLDS & LOWE, P.C.

(57) ABSTRACT

A catheter inserter for inserting a balloon catheter into an insertion opening of an endoscope provided with a valve. The balloon catheter includes a balloon attached on a distal end side of a shaft and configured to be expanded by an expansion fluid supplied from a proximal end side of the shaft, and an elastic band wound around an outer periphery of an intermediate portion of the balloon and configured to limit expansion of the balloon at the intermediate portion. The catheter inserter includes, on a distal end side thereof, a restrained member support structure configured to support a portion of an outer periphery of the elastic band. A proximal end support portion supporting a proximal end portion of the elastic band from a proximal end side is provided at a proximal end portion of the restrained member support structure.

10 Claims, 7 Drawing Sheets

(56) References Cited

U.S. PATENT DOCUMENTS

| | | | | |
|---|---|---|---|---|
| 6,416,529 B1* | 7/2002 | Holman | ................. | A61F 2/958 |
| | | | | 606/198 |
| 2007/0005122 A1* | 1/2007 | Inoue | ....................... | A61F 2/94 |
| | | | | 623/1.11 |
| 2015/0119640 A1* | 4/2015 | Reydel | ............. | A61B 17/00234 |
| | | | | 600/116 |
| 2015/0174383 A1* | 6/2015 | Tsutsui | ............. | A61M 25/1029 |
| | | | | 156/303.1 |

* cited by examiner

CATHETER INSERTER, CATHETER DEVICE

This application claims the benefit of priority to Japanese Patent Application Number 2022-156206 filed on Sep. 29, 2022. The entire contents of the above-identified application are hereby incorporated by reference.

TECHNICAL FIELD

The present disclosure relates to a catheter inserter and the like.

BACKGROUND ART

A catheter is a medical tube that is inserted into a body for inspection or treatment. In particular, a catheter including a balloon that can be expanded in the body is referred to as a balloon catheter, and is used for dilating a dilatation target portion and a constricted portion in: a tubular organ in a body such as blood vessels, trachea, gastrointestinal tract, common bile duct, and pancreatic ductus; a connection portion (inlet and outlet) between these; a hole formed in the body for inspection or treatment (a hole that is punctured into the common bile duct from the stomach and the duodenal bulb for example); and the like.

In JP 2014-124264 A, an elastic band portion is provided on the outer periphery of an intermediate portion of the balloon to reliably dilate the constricted portion. Expansion of the balloon starts from shoulder portions on both sides of the band portion so that the band portion between both shoulder portions forms a constricted waist portion. The constricted portion to be dilated is supported from both sides by the shoulder portions that have been expanded, and thus can stay at a position facing the waist portion. When the balloon is further expanded in this state, the constricted portion is reliably dilated by the band portion that elastically deforms for the dilatation.

SUMMARY

Such a balloon catheter for dilating a constricted portion may be inserted close to a target site through a forceps channel of an endoscope. A check valve (also referred to as a backflow prevention valve or a forceps plug) for preventing backflow of body fluid or the like from the distal end side or the inside of the body is provided on an insertion opening (an inlet of a forceps channel) of a balloon catheter in a typical endoscope. When the balloon catheter of JP 2014-124264 A is inserted into a check valve of an endoscope, the band portion provided on the outer periphery of the balloon is caught by the check valve, and thus the catheter may be dislocated or drop off.

The present disclosure is made in view of such circumstances, and an object thereof is to provide a catheter inserter and the like that enable a catheter to be effectively inserted into an insertion opening of an endoscope.

A catheter inserter according to an aspect of the present disclosure for solving the problem described above is a catheter inserter configured to insert a catheter into an insertion opening of an endoscope provided with a valve. The catheter includes a balloon attached on a distal end side of a shaft and configured to be expanded by a fluid supplied from a proximal end side of the shaft, and a restrained member wound around an outer periphery of an intermediate portion between a distal end portion and a proximal end portion of the balloon and configured to limit expansion of the balloon at the intermediate portion. The catheter inserter includes, on a distal end side thereof, a restrained member support structure configured to support at least a portion of an outer periphery of the restrained member.

In this aspect, the restrained member support structure of the catheter inserter supports the restrained member wound around the outer periphery of the balloon, so that the restrained member is effectively prevented from being dislocated or dropping off when the catheter is inserted into the valve on the insertion opening of the endoscope.

Another aspect of the present disclosure relates to a catheter inserter. The catheter inserter is a catheter inserter for inserting a catheter into an insertion opening of an endoscope provided with a valve. The catheter inserter covers a portion of an outer periphery of the catheter on a distal end side and covers the entire outer periphery of the catheter on a proximal end side.

In this aspect, the distal end side of the catheter inserter, which is inserted into the valve of the insertion opening of the endoscope, covers only a portion of the outer periphery of the catheter, thereby reducing the total cross-sectional area of the structure (the distal end side of the catheter inserter and the catheter) passing through the valve. In general, the size (total cross-sectional area) of the structure that can pass through the valve of the endoscope is limited. Thus, according to the present aspect, the catheter inserter and the catheter can be easily inserted into the valve, and the risk such as damage or the like of the valve can be reduced. In addition, according to the present aspect, since the cross-sectional area occupied by the catheter inserter (the distal end side) can be reduced (compared with that of the proximal end side), the catheter can be thickened (the cross-sectional area can be increased) accordingly. On the other hand, since the proximal end side of the catheter inserter covers the entire outer periphery of the catheter, the catheter is reliably held by the catheter inserter. Note that the catheter inserter according to the present aspect can be used for any catheter, not limited to a balloon catheter.

Yet another aspect of the present disclosure relates to a catheter device. The catheter device includes: a catheter including a balloon attached on a distal end side of a shaft and configured to be expanded by a fluid supplied from a proximal end side of the shaft, and a restrained member wound around an outer periphery of an intermediate portion between a distal end portion and a proximal end portion of the balloon and configured to limit expansion of the balloon at the intermediate portion; and a catheter inserter for inserting the catheter into an insertion opening of an endoscope provided with a valve. The catheter inserter covers, on a distal end side thereof, a portion of an outer periphery of the catheter and includes a restrained member support structure that supports a portion of an outer periphery of the restrained member.

Note that arbitrary combinations of the aforementioned components and those obtained by converting these expressions into methods, apparatuses, systems, recording media, computer programs, and the like are also included in the present disclosure.

According to the present disclosure, the catheter can be effectively inserted into the valve of the insertion opening of the endoscope.

DESCRIPTION OF EMBODIMENTS

Figure 1:
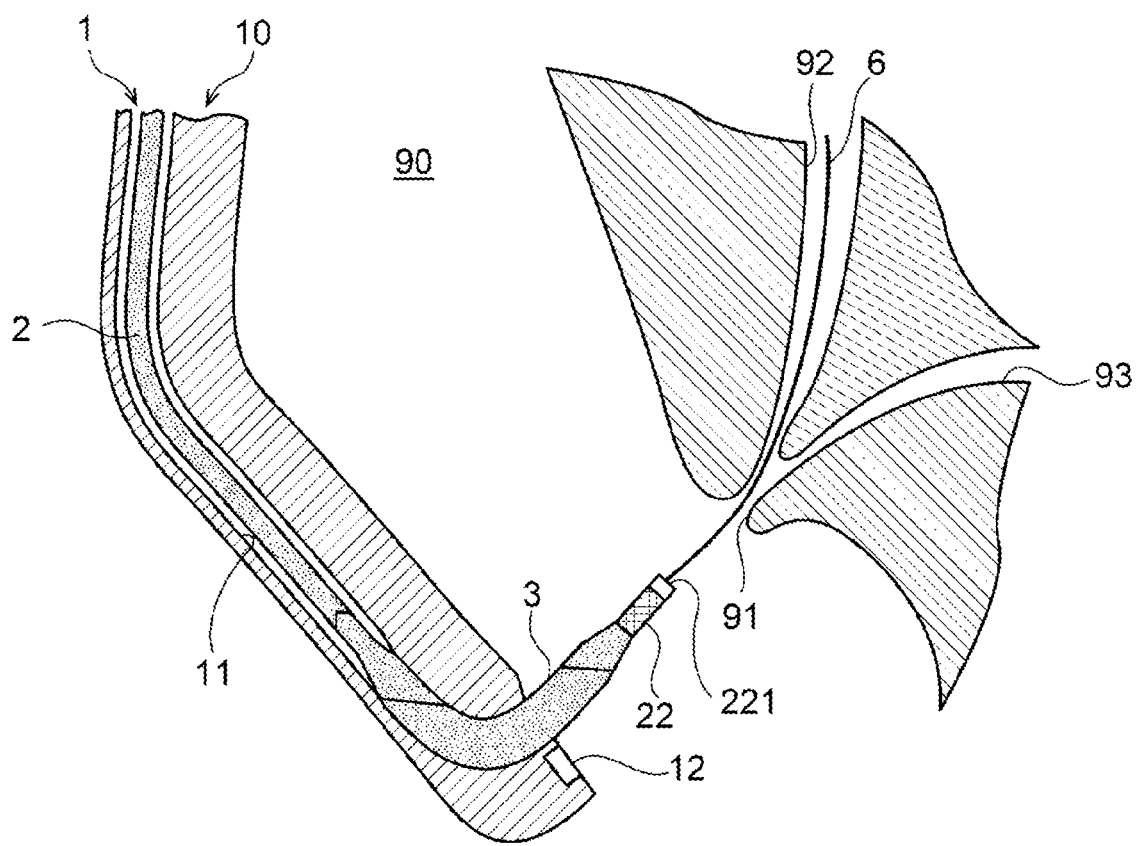
FIG. 1 schematically illustrates an overview of EPBD in which a papilla is a dilatation target.

Hereinafter, modes for carrying out the disclosure (hereinafter also referred to as embodiments) will be described in detail with reference to the drawings. In the description and/or drawings, the same or equivalent components, members, and processes, and the like are denoted by the same reference numerals, and redundant descriptions are omitted. The scales and shapes of the illustrated portions are set for convenience to simplify the explanation and should not be construed in a limited manner unless otherwise specified. The embodiments are illustrative and do not limit the scope of the disclosure in any way. Not all features or combinations of the features described in the embodiments are essential to the disclosure.

A catheter inserter according to the present disclosure can be used for any catheter, not limited to a balloon catheter. In addition, a balloon catheter can be used for dilatation of a dilatation target portion and a constricted portion of any part in the body (for example, tubular organ in the body such as blood vessels, trachea, gastrointestinal tract, common bile duct, and pancreatic duct; a connection portion between these; a hole formed in the body for inspection or treatment), but in the present embodiment, a description will be given by using, for example, an endoscopic papillary balloon dilatation (EPBD) or an endoscopic papillary large balloon dilation (EPLDB) for dilating a papilla (major duodenal papilla or duodenal papilla) as a dilatation target portion.

FIG. 1 schematically illustrates an overview of the EPBD in which a papilla 91 is a dilatation target. An endoscope 10 including a forceps channel 11 and a camera 12 is inserted in a duodenum 90 via the mouth. A balloon 3 is attached to a distal end side (the duodenum 90 side or the inside of the body) of a shaft 2, having a tubular shape, of a balloon catheter 1 inserted into the body through the forceps channel 11. The balloon 3 can be expanded by an expansion fluid obtained by mixing contrast agent as appropriate to sterile distilled water or saline, and supplied from the proximal end side (the mouth side or the outside of the body) of the shaft 2. Other types of liquid or gas such as air may be used as the expansion fluid, if necessary for the purpose of the inspection or the treatment.

A guidewire 6 with a small diameter is inserted in advance, through the forceps channel 11, in a common bile duct 92 and/or a pancreatic duct 93 that is the target site of the inspection or the treatment or a route leading to the target site. While the papilla 91 that is a dilatation target portion or opening portion is provided between the duodenum 90 and the common bile duct 92 and the pancreatic duct 93, the guidewire 6 has a diameter sufficiently smaller than the opening diameter of the papilla 91, and thus can enter into the common bile duct 92 or the pancreatic duct 93 through the papilla 91. In this process, an operator of the endoscope 10 and the balloon catheter 1 can safely insert the guidewire 6 into the papilla 91 while checking an image obtained from the camera 12 disposed on a side surface of the endoscope 10 to face the papilla 91.

A long wire lumen (hole) penetrating from a proximal end portion to a distal end portion and through which the guidewire 6 can be inserted, is formed inside the shaft 2, having a tubular shape, of the balloon catheter 1. In a state where the guidewire 6 is inserted into the common bile duct 92 or the pancreatic duct 93 through the papilla 91, the distal end portion of the wire lumen of the shaft 2 is inserted from the proximal end portion outside the body of the guidewire 6. so that the balloon 3 at the distal end portion of the shaft 2 guided by the guidewire 6 moves toward the papilla 91 as illustrated. In the state illustrated, the shaft 2 is further moved forward along the guidewire 6, and the balloon 3 that has reached the position of the papilla 91 is expanded by the expansion fluid. Thus, the papilla 91 is dilated from the inner side. In this way, the papilla 91, which is usually constricted by the sphincter Oddi (or biliary pancreatic ampulla sphincter) is dilated. Thus, a common bile duct stone formed in the common bile duct 92 can be effectively taken out through the papilla 91 for example.

The balloon 3 that is no longer needed after dilating the papilla 91 is deflated by discharging the expansion fluid to the outside of the body, and then is taken out from the body together with the shaft 2 through the forceps channel 11. After the balloon catheter 1 is taken out from the body as described above, a medical instrument such as another forceps or a cholangioscope for another medical procedure, for example, taking a common bile duct stone from the papilla 91 into the duodenum 90 or to the outside of the body, is inserted into the dilated papilla 91 through the forceps channel 11 and the guidewire 6 as necessary.

Figure 2:
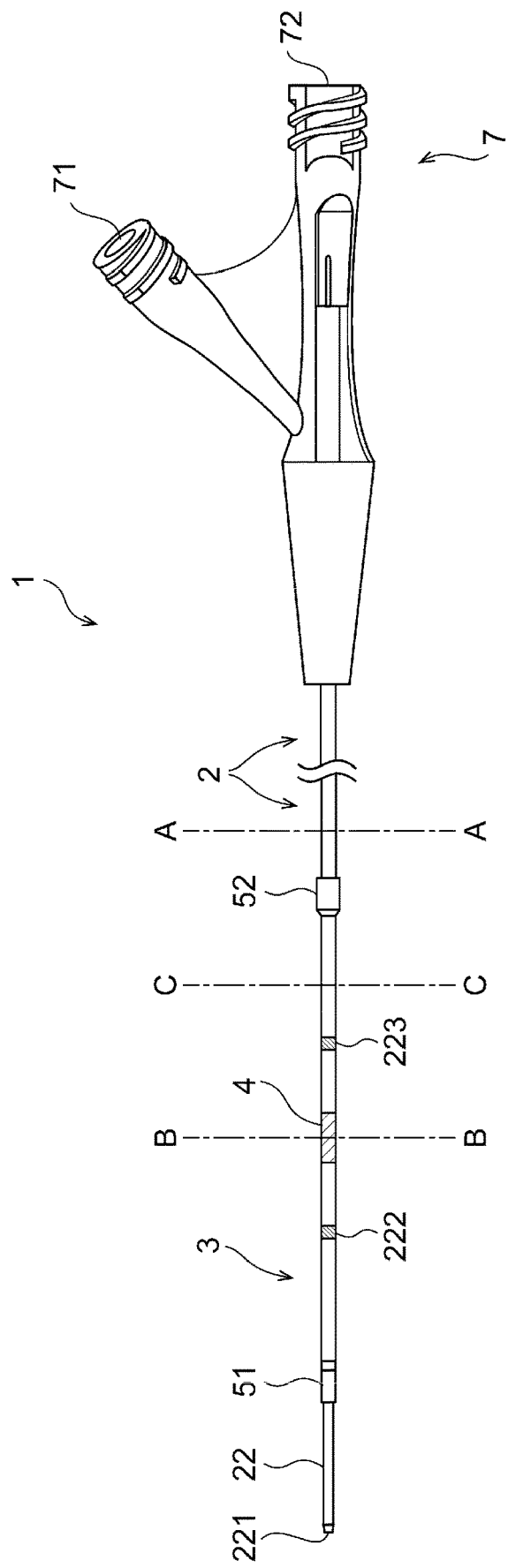
FIG. 2 is a side view illustrating an outer appearance of a balloon catheter according to an embodiment of the present disclosure.
Figure 3:
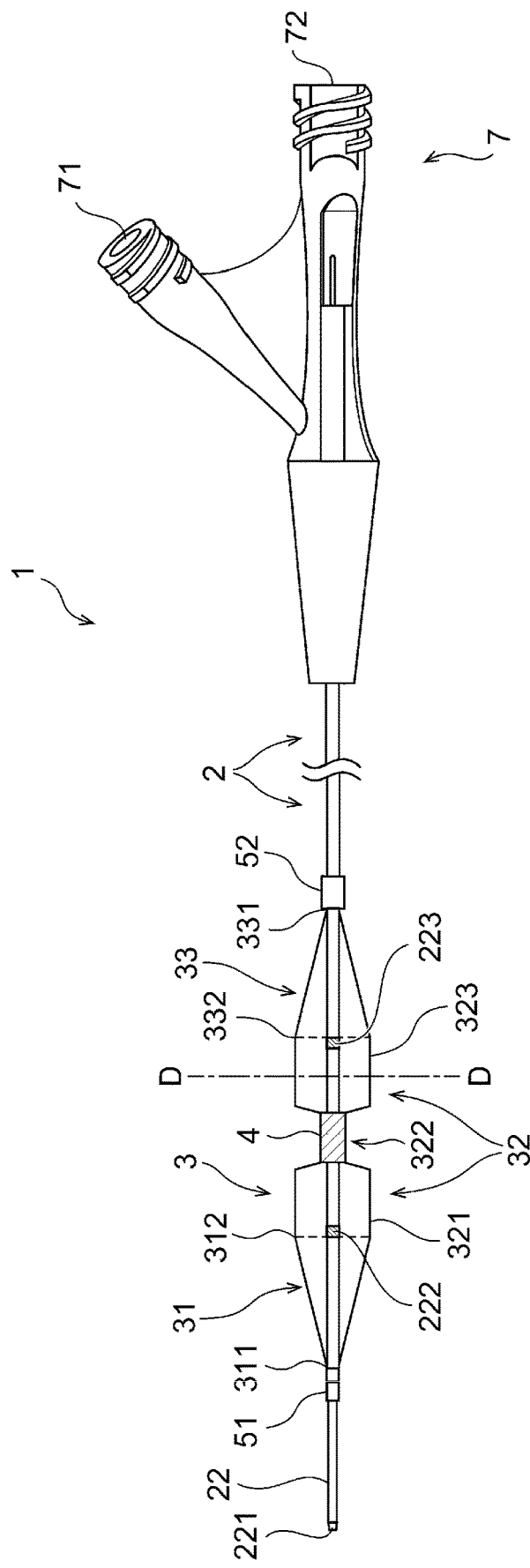
FIG. 3 is a side view illustrating the outer appearance of the balloon catheter according to the present embodiment.

FIGS. 2 and 3 are side views illustrating the outer appearance of the balloon catheter 1 according to the present embodiment. In these drawings, the balloon 3 is attached to a distal end portion (left end portion) of the shaft 2, having a long tube shape, inserted into the body from the right side (outside of the body) toward the left side (inside of the body). FIG. 2 illustrates the balloon 3 in a completely deflated state. FIG. 3 illustrates the balloon 3 in a partially expanded state which is a state between the completely deflated state and a completely expanded state.

Figure 4A:
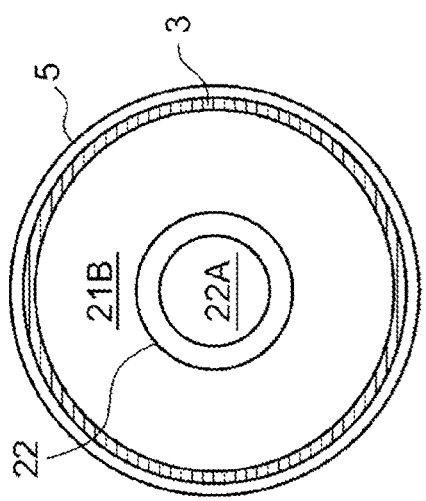
FIGS. 4A, 4B, 4C, and 4D are cross-sectional views of the balloon catheter according to the present embodiment.

A cross-section of the proximal end side of the shaft 2 being flexible, specifically, a portion of the shaft 2 in which the balloon 3 is not attached is partitioned into two lumens, that is, a balloon expansion lumen 21A and a wire lumen 22A as can be seen in FIG. 4A illustrating a cross-section taken along line A-A in FIG. 2. In the illustrated example, an expansion fluid tube 21 having a large diameter and a substantially circular shape and a guidewire tube 22 having a small diameter and a substantially circular shape and stored inside the expansion fluid tube 21 are integrally formed. The balloon expansion lumen 21A is a space defined by the inner periphery of the expansion fluid tube 21 and the outer periphery of the guidewire tube 22. The wire lumen 22A is a space defined by the inner periphery of the guidewire tube 22.

The balloon expansion lumen 21A communicates with a balloon expansion port 71 of a manifold 7 provided at the proximal end portion (the right end portion in FIGS. 2 and 3) outside the body of the shaft 2. The expansion fluid supplied and discharged through the balloon expansion port 71 flows through the balloon expansion lumen 21A between the inside and outside of the balloon 3. Specifically, when the expansion fluid is supplied from the balloon expansion port 71 to the inside of the body, the expansion fluid flows into the balloon 3 through the balloon expansion lumen 21A, and thus the balloon 3 expands. On the other hand, when the expansion fluid is discharged through the balloon expansion port 71 to the outside of the body, the expansion fluid flows out of the balloon 3 through the balloon expansion lumen 21A, and thus the balloon 3 shrinks.

Although not illustrated, the expansion fluid tube 21 forming the balloon expansion lumen 21A has a tapered shape, and an opening end having a small diameter is inserted in an internal space 21B of the balloon 3. The expansion fluid flows through this opening end between the expansion fluid tube 21 (balloon expansion lumen 21A) and the internal space 21B of the balloon 3. The internal space 21B of the balloon 3 is illustrated as a space defined by the inner periphery of the balloon 3 and the outer periphery of the guidewire tube 22, in FIGS. 4B, 4C, and 4D illustrating cross sections taken along lines B-B, C-C, and D-D in FIG. 2 or 3, respectively.

The wire lumen 22A communicates with a guidewire port 72 of the manifold 7 provided to the proximal end portion of the shaft 2 (the right end portion in FIGS. 2 and 3) on the outside of the body. The guidewire tube 22 forming the wire lumen 22A is formed through the internal space 21B of the balloon 3 toward the distal end side (left end side in FIGS. 2 and 3), unlike the expansion fluid tube 21 terminating within the internal space 21B of the balloon 3. As described above, the long wire lumen 22A, in which the guidewire 6 can be inserted, is formed inside the shaft 2, having tubular shape, of the balloon catheter 1, that is, from the guidewire port 72 in the proximal end portion to an opening end 221 in the distal end portion. As described above with reference to FIG. 1, in a state where the guidewire 6 is inserted through the papilla 91 into the common bile duct 92 or the pancreatic duct 93, the opening end 221 of the wire lumen 22A is inserted from the proximal end portion of the guidewire 6 on the outside of the body so that the balloon 3 at the distal end portion of the shaft 2 guided by the guidewire 6 moves toward the papilla 91.

To reliably position the balloon 3 to the papilla 91, a contrast agent mixed in the expansion fluid to be supplied into the balloon 3 and a pair of contrast markers 222, 223 provided at axial positions corresponding to both end portions (312, 332) of an intermediate portion 32, which is described below, of the balloon 3 on the outer periphery of the shaft 2 (guidewire tube 22) are used. Using a contrast image captured during the EPBD procedure using X ray or the like, the position of the balloon 3 relative to the papilla 91 and the state of expansion of the balloon 3 can be checked in real time.

Figure 4B:
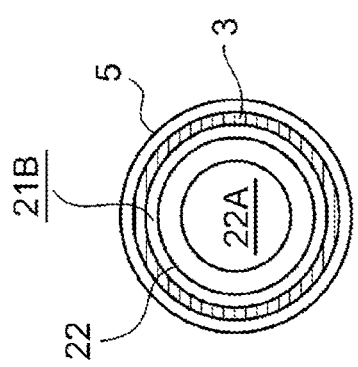
Figure 4C:
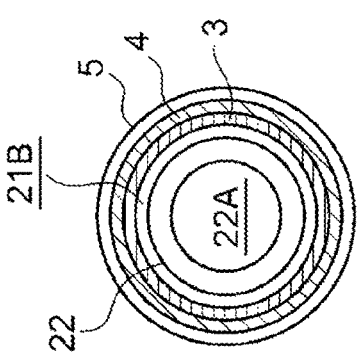
Figure 4D:
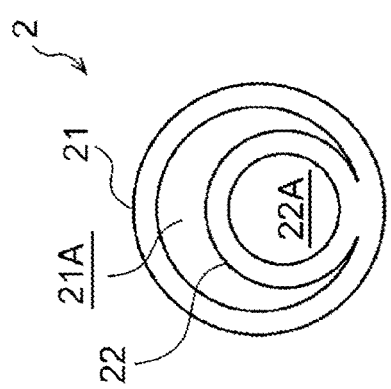

As illustrated in FIGS. 4B and 4C, the balloon 3 folded in the completely deflated state is attached to the outer periphery of the guidewire tube 22 forming the distal end portion of the shaft 2. The internal space 21B between the inner periphery of the balloon 3 in the completely deflated state and the outer periphery of the guidewire tube 22 is illustrated in an exaggerated manner in FIGS. 4B and 4C. The space is actually small enough to be ignorable. As described above, the inner periphery of the balloon 3 in the completely deflated state and the outer periphery of the guidewire tube 22 are in contact with each other almost with no gap in between.

As illustrated in FIG. 3, the balloon 3 includes three portions different from each other in the expanded form or expansion mode that are a distal end side tapered portion 31, an intermediate portion 32, and a proximal end side tapered portion 33 in this order from the distal end toward the proximal end. The distal end side tapered portion 31 is formed in a tapered shape that has the maximum expansion diameter increasing toward the intermediate portion 32 on the proximal end side from a distal end portion 311, the diameter of which is substantially the same as that of the outer periphery of the guidewire tube 22. The proximal end side tapered portion 33 is formed in a tapered shape that has the maximum expansion diameter increasing toward the intermediate portion 32 on the distal end side from a proximal end portion 331, the diameter of which is substantially the same as that of the outer periphery of the guidewire tube 22 (and the shaft 2 provided together with the expansion fluid tube 21 having a tapered shape).

In the illustrated example, in a direction connecting the distal end (opening end 221) and the proximal end (guidewire port 72) of the shaft 2 (hereinafter, the direction will be also referred to as an axial direction, an insertion direction, a longitudinal direction, or a left-right direction, and the dimension in the direction will be also referred to as a length), the length of the distal end side tapered portion 31 and the length of the proximal end side tapered portion 33 are substantially equal but may be significantly different from each other. Further, in the illustrated example, in any direction orthogonal to the axial direction (hereinafter, the direction will be also referred to as a radial direction, an expansion direction, or an orthogonal direction, and the dimension in the direction will be also referred to as a diameter or an expansion diameter), the expansion diameter of the distal end side tapered portion 31 and the expansion diameter of the proximal end side tapered portion 33 respectively at points equally distant from the distal end portion 311 and the proximal end portion 331 in the axial direction are substantially equal (in other words, the inclination of the distal end side tapered portion 31 and the inclination of the proximal end side tapered portion 33 are substantially equal) but may be significantly different from each other. In the illustrated example where the maximum expansion diameter of the proximal end portion 312 of the distal end side tapered portion 31 and the maximum expansion diameter of the distal end portion 332 of the proximal end side tapered portion 33 are substantially equal, the intermediate portion 32 via which the tapered portions are connected in the axial direction serves as a straight tube portion having a substantially uniform maximum expansion diameter (however, in FIG. 3, the intermediate portion 32 has a constricted shape by the elastic band 4).

As illustrated in FIGS. 3 and 4B, an annular elastic band 4 serving as a restrained member is wound around at least part of the outer periphery of the intermediate portion 32, to limit the expansion of the balloon 3 in the intermediate portion 32. The elastic band 4 is made of an elastomer such as rubber or any other elastic material. In the illustrated example, an elastic band 4 having a band shaped and having a uniform width or length in the axial direction is wound around the outer periphery of a center portion 322 of the intermediate portion 32. The elastic band 4 does not limit the expansion of a distal end side straight tube portion 321 closer to the distal end side than the center portion 322 in the intermediate portion 32. Thus, the distal end side straight tube portion 321 can easily expand to have a substantially uniform maximum expansion diameter. Similarly, the elastic band 4 does not limit the expansion of a proximal end side straight tube portion 323 closer to the proximal end side than the center portion 322 in the intermediate portion 32. Thus, the proximal end side straight tube portion 323 can easily expand to have a substantially uniform maximum expansion diameter. On the other hand, the elastic band 4 limits the expansion of the center portion 322 of the intermediate portion 32. Thus, the expansion diameter of the center portion 322 in a case where the pressure of the expansion fluid in the balloon 3 (internal space 21B) is less than a predetermined value (less than 2 atm for example) is substantially (at least 20% for example) smaller than the expansion diameter of the distal end side straight tube portion 321 and the proximal end side straight tube portion 323 that can be easily expanded.

The balloon 3 as described above is effectively positioned with respect to a dilatation target portion such as the papilla 91 (FIG. 1) by the elastic band 4. For example, when the balloon 3 is guided by the guidewire 6 (FIG. 1) and the intermediate portion 32 or the center portion 322 reaches the position of the papilla 91, the balloon 3 starts expanding by the expansion fluid supplied through the balloon expansion port 71. As illustrated in FIG. 3, portions, of the balloon 3, where the elastic band 4 is not provided (specifically, the distal end side tapered portion 31, the distal end side straight tube portion 321, the proximal end side straight tube portion 323, and the proximal end side tapered portion 33) can easily expand. On the other hand, the expansion of the center portion 322 near the papilla 91 is limited by the elastic band 4. As a result, the balloon 3 expands into a constricted shape, that is, the center portion 322 at the intermediate portion 32 is a constricted portion.

The papilla 91 near the center portion 322 as the constricted portion is supported from both sides by both end portions (in particular, the distal end side straight tube portion 321 and the proximal end side straight tube portion 323 that are located adjacent to the center portion 322) of the balloon 3, which are firstly expanded largely so that the papilla 91 remains at a position facing the center portion 322 (constricted portion). In other words, the center portion 322 (constricted portion) of the balloon 3 can be reliably positioned with respect to the papilla 91 that is a dilatation target portion. Further, when the expansion fluid is continuously supplied from the balloon expansion port 71 and the balloon expansion lumen 21A into the balloon 3 expanded in the constricted shape, the center portion 322 (constricted portion) is expanded later than the both end portions, and thus the papilla 91 as a dilatation target portion is dilated. At this time, the constriction in the center portion 322 shrinks (is reduced) in accordance with the volume of the expansion fluid in the internal space 21B of the balloon 3 and/or an increase in pressure of the expansion fluid, and finally substantially disappears (in other words, the intermediate portion 32 is expanded into a substantially straight tubular shape with substantially no constricted portion. However, when the maximum expansion diameter of the papilla 91 is small, a constriction may remain in the center portion 322).

Note that, in the above description, the elastic band 4 that is a single elastic member formed in an annular shape and/or a band shape surrounding at least a portion (the center portion 322) of the outer periphery of the intermediate portion 32 is described as an example of the restrained member; however, the restrained member is not limited to such an elastic member. For example, the restrained member may be a plurality of elastic rings wound around at least part of the outer periphery of the intermediate portion 32, or may be a coil spring made of a nickel titanium alloy (NiTi) or the like spirally wound around at least part of the outer periphery of the intermediate portion 32. Note that, these elastic members may be any member that applies significant elastic force in a shrinkage direction at the time of expansion due to the pressure of the expansion fluid, and does not necessarily need to completely return to the original state (diameter) after the expansion fluid is discharged. Thus, the elastic member may remain somewhat deformed (that is, plastic deformation) after the expansion fluid has been discharged. The restrained member may be a member having no or limited elasticity. For example, a plastic member made of metal or the like that is plastically deformed by the balloon 3 expanding and then can expand but cannot shrink after expanded once may be used as the restrained member. In addition, a rigid member that is substantially non-deformable and breaks when the pressure of the expansion fluid in the balloon 3 reaches or exceeds a predetermined value may be used as the restrained member.

Further, the restrained member as an elastic member or a plastic member may break when the pressure of the expansion fluid in the balloon 3 is further increased after the restrained member is elastically deformed or plastically deformed to a predetermined diameter. When the restrained member is thus removed, the center portion 322 automatically expands to the maximum expansion diameter. As a result, the intermediate portion 32 as a whole expands to the substantially uniform maximum expansion diameter into a straight tubular shape. Note that a covering member 5 described below covers the restrained member, including the plastic member plastically deformed or the rigid member broken, from the outer periphery, so that the restrained member can be prevented from dropping from the balloon 3 and/or the shaft 2. Because the restrained member is thus prevented from dropping off in the body, the restrained member can also be formed of a material that is not usually used for medical purposes. The restrained member (the elastic band 4 or the like) may be formed of a material that does not transmit X-rays, to have a contrast function similar to that of the contrast markers 222 and 223 provided on the outer periphery of the guidewire tube 22.

The covering member 5 covers the outer periphery of the elastic band 4 at the center portion 322 of the balloon 3 as illustrated in FIG. 4B and covers the outer periphery of the balloon 3 at portions other than the center portion as illustrated in FIGS. 4C and 4D. The covering member 5 is an elastic tube having a long tubular shape formed by any elastic material such as polyurethane. In FIG. 3, the distal end portion of the covering member 5 (not illustrated) is fixed by a short fixing tube 51 made of thermoplastic elastomer or the like, in a state of covering the outer periphery of the guidewire tube 22 extending toward the distal end side from the distal end portion 311 of the balloon 3. The proximal end portion of the covering member 5 is fixed by a short fixing tube 52 made of thermoplastic elastomer or the like, in a state of covering the outer periphery of the shaft 2 (the expansion fluid tube 21) extending toward the proximal end side from the proximal end portion 331 of the balloon 3. The fixing tube 51 has a diameter smaller than a diameter of the fixing tube 52 due to a difference in diameter between the guidewire tube 22 having a small diameter on the distal end side and the expansion fluid tube 21 having a large diameter on the proximal end side. As illustrated in FIG. 2, the fixing tube 52 forms a projection (hereinafter, also referred to as a projection 52) on the proximal end side of the balloon 3 in the shaft 2. In other words, the projection 52 forms a step between a small-diameter portion (formed by the guidewire tube 22 having a small diameter or the like) on the distal end side thereof and a large-diameter portion (formed by the expansion fluid tube 21 having a large diameter or the like) on the proximal end side thereof.

As described above, both end portions of the covering member 5 longer than the elastic band 4 and the balloon 3 are fixed to the outer periphery of the shaft 2 at portions on the distal end side and the proximal end side of the elastic band 4. Note that the covering member 5 may not be provided, and in this case, the elastic band 4 and the balloon 3 are exposed to the outer periphery. Further, the covering member 5 may be shorter than the balloon 3 and may have both end portions fixed to the outer periphery of the balloon 3 at portions on the distal end side and the proximal end side of the elastic band 4. For example, both end portions of the covering member 5 may be fixed to the outer periphery of the distal end side tapered portion 31 and the proximal end side tapered portion 33, or fixed to the outer periphery of the distal end side straight tube portion 321 and the proximal end side straight tube portion 323. Further, in some cases, an electrode for medical procedure, measurement, or the like or a distal end tip (a member in which the opening end 221 is formed) forming the distal end portion of the balloon catheter 1 or the shaft 2 is provided on the distal end side from the balloon 3 in the balloon catheter 1, and the distal end portion of the covering member 5 may be fixed to the outer periphery of such an electrode or a distal end tip.

In these cases, the covering member 5 covers the outer periphery of the balloon 3 not wound by the elastic band 4 together with the outer periphery of the elastic band 4. Therefore, the elastic band 4 and other restrained members can be prevented from dropping from the balloon 3 or being dislocated. Further, in a case where the covering member 5 covers the outer periphery of the shaft 2 to which the balloon 3 is not attached together with the outer periphery of the elastic band 4 and the balloon 3, the elastic band 4 and other restrained members can be prevented from dropping from the balloon 3 and the shaft 2 or being dislocated, and in addition, the balloon 3 can be effectively shrunk by the elasticity of the covering member 5 when the balloon catheter 1 is taken out.

As described above, the covering member 5 has end portions fixed to the outer periphery of the shaft 2 and/or the balloon 3, but does not have portions other than both end portions fixed to the outer periphery of the balloon 3 and/or the elastic band 4. Thus, as illustrated in FIG. 4B, the elastic band 4 covered by the covering member 5 from the outer side is not bonded to the inner periphery of the covering member 5. Similarly, the elastic band 4 is not bonded to the outer periphery of the balloon 3 (center portion 322) on the inner side. However, the elastic band 4 is pressed against the balloon 3 from the outer side by the elasticity of the covering member 5 and thus can remain at a predetermined position (at the center portion 322) so that the elastic band 4 can be prevented from dropping from the balloon 3. In JP 2014-124264 A, a band portion is welded to a balloon, but in the present embodiment, the elastic band 4 does not need to be bonded to the balloon 3 (and the covering member 5). Thus, the balloon catheter 1 can be manufactured economically. In addition, when the band portion is welded to the balloon as in JP 2014-124264 A, a desired expansion of the balloon and the band portion might be inhibited at the welded portion. In the present embodiment, the elastic band 4 and the balloon 3 are not welded or bonded, so that those can achieve desired expansion without inhibiting each other.

The covering member 5 with elasticity, in the state in FIG. 2 where the balloon 3 is not expanded, holds the balloon 3 in the completely deflated state by pressing the balloon 3 and/or the elastic band 4 from the outer side. As illustrated in FIG. 3, when the expansion fluid is supplied into the balloon 3 (internal space 21B), and the balloon 3 and/or the elastic band 4 expands, the covering member 5 elastically deforms and expands following the expansion thereof.

To achieve the predetermined expanded form of the balloon 3, the elastic band 4, and the covering member 5, the elastic modulus of the balloon 3 is set to be higher than that of the elastic band 4, and the elastic modulus of the elastic band 4 is set to be higher than that of the covering member 5. Since the elastic modulus (also known as Young's modulus) represents the resistance to deformation, the balloon 3 is less deformable than the elastic band 4, and the elastic band 4 less deformable than the covering member 5. In other words, the covering member 5, the elastic band 4, and the balloon 3 are deformable in this order. When the balloon 3 and/or the elastic band 4 on the inner side expands, the most deformable covering member 5 expands substantially completely following the expansion.

Figure 5:
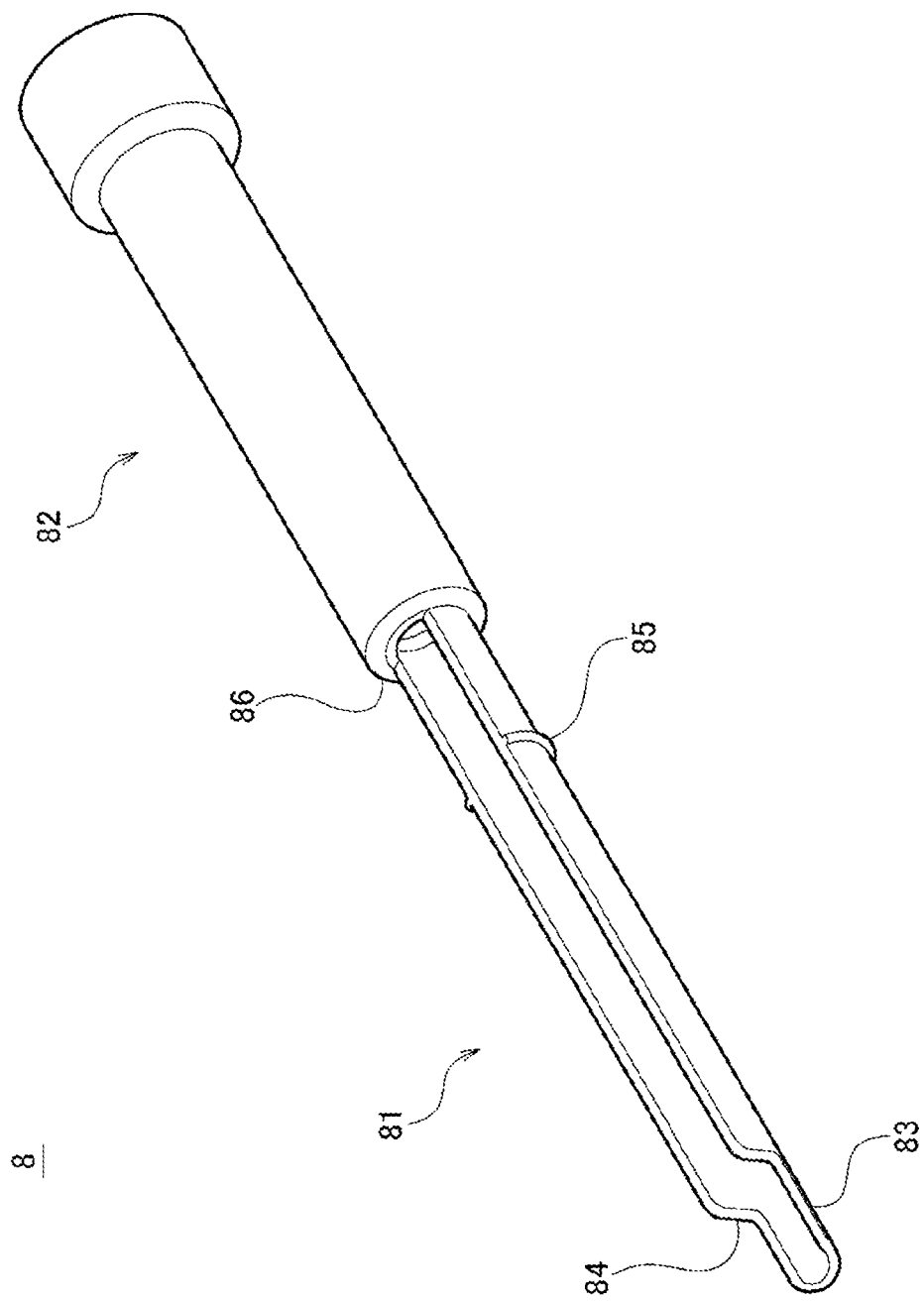
FIG. 5 is a perspective view schematically illustrating a catheter inserter for inserting the balloon catheter into an insertion opening of an endoscope.
Figure 6:
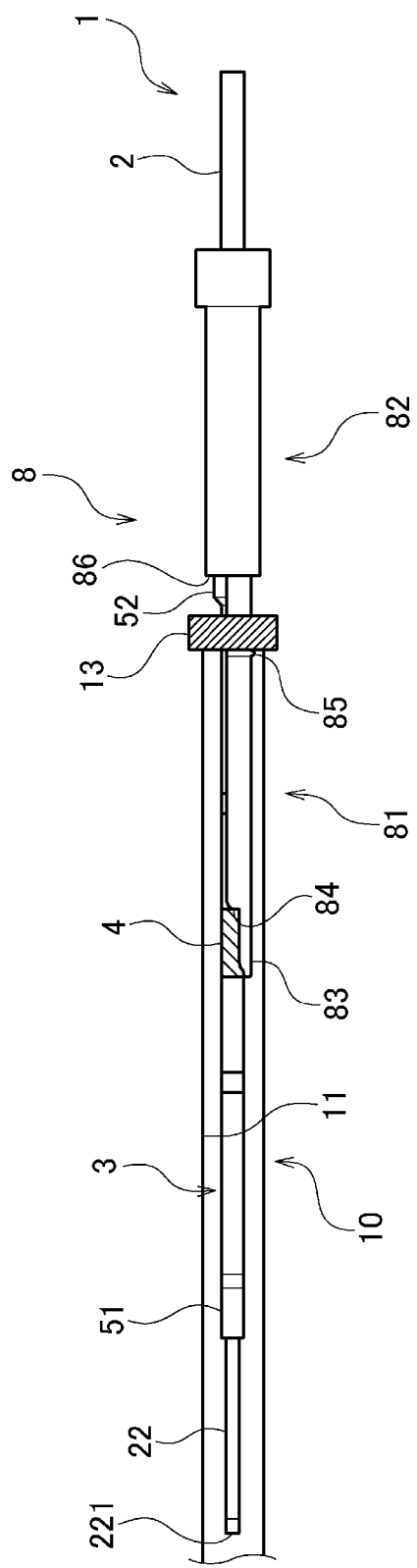
FIG. 6 is a side view schematically illustrating a state in which the balloon catheter is inserted into the insertion opening of the endoscope by using the catheter inserter.

FIG. 5 is a perspective view schematically illustrating a catheter inserter 8 for inserting the aforementioned balloon catheter 1 into an insertion opening (an inlet on the proximal end side of the forceps channel 11) of the endoscope 10. FIG. 6 is a side view schematically illustrating a state in which the balloon catheter 1 is inserted into the insertion opening of the endoscope 10 by using the catheter inserter 8. In the following descriptions, the configuration of each portion of the catheter inserter 8 will be described mainly with reference to FIG. 5, and the insertion mode of the balloon catheter 1, will be referred with reference to also FIG. 6.

The catheter inserter 8 is made of any material such as polyethylene. A catheter insertion passage through which the shaft 2 of the balloon catheter 1 and the balloon 3 in the deflated state as illustrated in FIG. 2 can be inserted is formed in the insertion direction at the center portion in the radial direction of the catheter inserter 8 that is long in the insertion direction or the axial direction. A distal end portion 81 on the distal end side of the catheter inserter 8 covers a portion of the outer periphery of the balloon catheter 1 (not illustrated in FIG. 5) passing through the catheter insertion passage, and a proximal end portion 82 on the proximal end side covers the entire outer periphery of the balloon catheter 1. The length of each of the distal end portion 81 and the proximal end portion 82 in the insertion direction is arbitrary as long as at least a portion of the functions and/or effects of the catheter inserter 8 described below can be achieved. In particular, the length of the distal end portion 81 which can realize many of the functions and/or effects of the catheter inserter 8 is naturally limited, while the length of the proximal end portion 82 is flexible. Thus, the proximal end portion 82 can be significantly longer than the distal end portion 81. In this case, the majority of the length of the catheter inserter 8 is occupied by the proximal end portion 82.

Here, "a portion of the outer periphery" is any portion greater than 0% and less than 100% of the outer periphery. In the illustrated example, the distal end portion 81 of the catheter inserter 8 has a substantially halved structure (a structure in which a tube is substantially halved in a cross section including the central axis) surrounding substantially half of the outer periphery of the balloon catheter 1 passing through the catheter insertion passage (hereinafter, also referred to as a lower half or a southern hemisphere for convenience). Note that, for example, the (entirely) tubular distal end portion 81 may cover the entire outer periphery of the balloon catheter 1 passing through the catheter insertion passage, or the proximal end portion 82 having a substantially halved structure may cover a portion of the outer periphery of the balloon catheter 1.

As illustrated in FIG. 6, a restrained member support structure 83 that directly or indirectly supports at least a portion of the outer periphery of the restrained member such as the elastic band 4 of the balloon catheter 1 passing through the catheter insertion passage is provided on the distal end side of the distal end portion 81 of the catheter inserter 8. Note that, when the outer periphery of the elastic band 4 is covered by the covering member 5 as in the example described above, the restrained member support structure 83 indirectly supports the outer periphery of the elastic band 4 via the covering member 5. In order to reliably hold the elastic band 4, the length of the restrained member support structure 83 in the insertion direction is preferably larger than the length of the elastic band 4 in the insertion direction (axial direction). Note that the proximal end portion of the elastic band 4 is supported by a proximal end support portion 84 described below. Thus, even when the length of the restrained member support structure 83 in the insertion direction is smaller than the elastic band 4, the restrained member support structure 83 can support the elastic band 4 together with the proximal end support portion 84. As described above, the distal end portion 81 in the illustrated example has a substantially halved structure as a whole; however, the restrained member support structure 83 covers a circumferential range, which is smaller than a half of the outer periphery of the balloon catheter 1 passing through the catheter insertion passage, when viewed along the insertion direction (when viewed along the axial direction). In other words, the restrained member support structure 83 does not have a substantially halved structure.

As described above, a sort of step is formed between the restrained member support structure 83 on the distal end side, which does not have a substantially halved structure, and the remaining portion on the proximal end side of the distal end portion 81, which has a substantially halved structure, and thus the proximal end support portion 84 is formed. As illustrated in FIG. 6, the proximal end support portion 84 provided at the proximal end portion of the restrained member support structure 83 supports the proximal end portion of the elastic band 4 from the proximal end side. Specifically, for example, in FIG. 2, the proximal end portion of the elastic band 4 slightly projecting in the radial direction from the surface of the balloon 3 in the deflated state is caught by the stepped proximal end support portion 84 and thereby is supported from the proximal end side. The proximal end support portion 84 that is distal ends of the substantially halved structure of the distal end portion 81 is provided on both sides in the circumferential direction of the restrained member support structure 83 not having a substantially halved structure, when viewed along the insertion direction. In other words, the proximal end support portion 84 has a configuration in which the restrained member support structure 83 is configured to extend in the circumferential direction on the both sides when viewed along the insertion direction.

As illustrated in FIG. 6, on the proximal end side of the distal end portion 81 of the catheter inserter 8, a valve holding structure 85 is provided that holds, on the proximal end side (strictly, between a valve 13 and a projection support portion 86 described below), the valve 13 such as a check valve provided at the insertion opening of the endoscope 10. Specifically, the valve holding structure 85 is a projection that slightly projects in the radial direction from the outer circumferential surface on the proximal end side of the distal end portion 81 having a substantially halved tubular shape. The valve holding structure 85 having such a projecting shape is formed in a partial annular shape (substantially semi-annular shape) that surrounds, in the circumferential direction, a portion or all of the outer periphery of the distal end portion 81 having a substantially halved tubular shape. As illustrated in FIG. 6, after the distal end portion 81 of the catheter inserter 8 is inserted into the valve 13 on the insertion opening of the endoscope 10, the valve holding structure 85 holds the valve 13 in a limited range in the insertion direction (a range in the axial direction) between the valve holding structure 85 and the projection support portion 86 described below so that the valve 13 (that is, the entire endoscope 10) and the catheter inserter 8 are not largely dislocated in the insertion direction.

The proximal end side of the restrained member support structure 83, the proximal end support portion 84, and the valve holding structure 85 which are provided at the distal end portion 81 of the catheter inserter 8 is provided with the projection support portion 86 for supporting the projection 52 (fixing tube 52) illustrated in FIG. 2 or the like of the balloon catheter 1 from the proximal end side when the restrained member such as the elastic band 4 is supported by the restrained member support structure 83 (and the proximal end support portion 84) as illustrated in FIG. 6. The projection support portion 86 is a boundary portion or a connection portion between the distal end portion 81 having a substantially halved tubular shape and the proximal end portion 82 having a fully tubular shape. Thus, the catheter inserter 8 covers a portion of the outer periphery of the balloon catheter 1 on the distal end side (distal end portion 81) of the projection support portion 86, and covers the entire outer periphery of the balloon catheter 1 on the proximal end side (proximal end portion 82) from the projection support portion 86.

When viewed along the insertion direction or the axial direction, the thick and large-diameter (outer diameter) proximal end portion 82 having a fully tubular shape surrounds the outer periphery of the thin and small-diameter (outer diameter) distal end portion 81 having a substantially halved tubular shape. In addition, of the substantially annular distal end surface of the proximal end portion 82 having a fully tubular shape, the remaining substantially half (hereinafter, also referred to as an upper half or a northern hemisphere for convenience) in which the distal end portion 81 having a substantially halved tubular shape does not exist when viewed along the insertion direction substantially functions as the projection support portion 86. As described above, the projection support portion 86 provided on the northern hemisphere side and the distal end portion 81 including the restrained member support structure 83 provided on the southern hemisphere side are provided at circumferential positions opposite to each other when viewed along the insertion direction. As illustrated in FIG. 6, the projection support portion 86 supports the proximal end portion of the projection 52 of the balloon catheter 1 from the proximal end side. Specifically, for example, in FIG. 2, the proximal end portion of the projection 52 slightly projecting in the radial direction from the surface of the shaft 2 is caught by the stepped projection support portion 86 and thereby is supported from the proximal end side.

As illustrated in FIG. 6, a distance (i.e., the entire length of the distal end portion 81) in the insertion direction (left-right direction) between the projection support portion 86 and the distal end of the restrained member support structure 83 (i.e., the distal end of the distal end portion 81 and the catheter inserter 8) is preferably equal to or greater than a distance in the axial direction (left-right direction) between the distal end of the elastic band 4 and the proximal end of the projection 52 in the balloon catheter 1. In the example in FIG. 6, the distance between the projection support portion 86 and the distal end of the restrained member support structure 83 is substantially equal to the distance between the distal end of the elastic band 4 and the proximal end of the projection 52. In this case, the support of substantially the entire length of the elastic band 4 in the axial direction by the restrained member support structure 83, the support of the proximal end portion of the elastic band 4 by the proximal end support portion 84, and the support of the proximal end portion of the projection 52 by the projection support portion 86 are simultaneously achieved.

When being inserted into the valve 13 of the endoscope 10 by being simultaneously supported by the restrained member support structure 83, the proximal end support portion 84, and the projection support portion 86, the balloon catheter 1 is securely held at the illustrated desired position and orientation with respect to the catheter inserter 8. Specifically, the axes of the balloon catheter 1 and the catheter inserter 8 substantially coincide with each other, and the axial positions of components of the balloon catheter 1 (in particular, the elastic band 4 and the projection 52) substantially coincide with the axial positions of corresponding components of the catheter inserter 8 (in particular, the restrained member support structure 83/the proximal end support portion 84 corresponding to the elastic band 4 and the projection support portion 86 corresponding to the projection 52).

Even when the elastic band 4 of the balloon catheter 1 at the time of insertion into the valve 13 of the endoscope 10 is removed from the restrained member support structure 83 and the proximal end support portion 84, torque or moment for rotating the balloon catheter 1 about the projection 52 in the counterclockwise direction in FIG. 6 is generated by resistance force received by the projection 52 from the projection support portion 86 toward the distal end side, so that the elastic band 4 is naturally accommodated in the restrained member support structure 83 and the proximal end support portion 84. The reason why the torque or moment for automatically returning the balloon catheter 1 to the desired state illustrated in FIG. 6 is generated as described above is that the projection support portion 86, the restrained member support structure 83, and the like are provided at circumferential positions opposite to each other when viewed along the insertion direction (that is, on the northern hemisphere side and the southern hemisphere side) as described above. Note that the same functions and/or effects as described above are also achieved in the balloon catheter 1 at the time of removing from the valve 13 of the endoscope 10.

Note that, the distance between the projection support portion 86 and the distal end of the restrained member support structure 83 may be smaller than the distance between the distal end of the elastic band 4 and the proximal end of the projection 52. In this case, when the elastic band 4 is supported by the restrained member support structure 83 and the proximal end support portion 84, the projection 52 is located within the proximal end portion 82 and is not in contact with (not supported by) the projection support portion 86. Similarly, the distance between the projection support portion 86 and the distal end of the restrained member support structure 83 may be larger than the distance between the distal end of the elastic band 4 and the proximal end of the projection 52. In this case, when the elastic band 4 is supported by the restrained member support structure 83 and the proximal end support portion 84, the projection 52 is located on the distal end side of the projection support portion 86 and is not in contact with (not supported by) the projection support portion 86. The projection support portion 86 in such a case is useless when the balloon catheter 1 is inserted into the valve 13, but is still useful when the balloon catheter 1 described below is removed from the valve 13.

As described above, after the distal end portion 81 of the catheter inserter 8 is inserted into the valve 13 of the endoscope 10 together with the balloon catheter 1 (particularly, the elastic band 4), the valve 13 is held in a limited range in the insertion direction between the valve holding structure 85 and the projection support portion 86. The distance in the insertion direction between the valve holding structure 85 and the projection support portion 86 may be equal to or larger than the length or thickness of the valve 13 in the axial direction. Further, in the valve 13, an insertion opening (not illustrated) is formed in the insertion direction, the insertion opening having a size through which the small-diameter distal end portion 81 of the catheter inserter 8 can pass but the large-diameter proximal end portion 82 cannot pass. As a result, the valve 13 in the range located on the proximal end side from the valve holding structure 85 in the axial direction is effectively suppressed from moving toward the proximal end side of the projection support portion 86. Note that, the valve 13 is, for example, a check valve to suppress backflow of body fluid or the like from the distal end side or the inside of the body in the forceps channel 11.

According to the present embodiment, as illustrated in FIG. 6, since the elastic band 4 wound around the outer periphery of the balloon 3 of the balloon catheter 1 is supported by the restrained member support structure 83 and the proximal end support portion 84 of the catheter inserter 8, the elastic band 4 and the covering member 5 are effectively suppressed from being dislocated or dropped when the balloon catheter 1 is inserted into the valve 13 on the insertion opening of the endoscope 10 together with the catheter inserter 8.

Further, according to the present embodiment, the distal end portion 81 of the catheter inserter 8 inserted into the valve 13 on the insertion opening of the endoscope 10 covers only a portion (the southern hemisphere) of the outer periphery of the balloon catheter 1, so that the total cross-sectional area of the structure (the distal end portion 81 of the catheter inserter 8 and the balloon catheter 1) that passes through the valve 13 can be reduced. In general, the size (total cross-sectional area) of the structure that can pass through the valve 13 of the endoscope 10 is limited, and thus according to the present embodiment, the catheter inserter 8 and the balloon catheter 1 can be easily inserted into the valve, and the risk of damage or the like of the valve 13 can be reduced. Further, according to the present embodiment, since the cross-sectional area occupied by the distal end portion 81 can be smaller than that of the proximal end portion 82, the balloon catheter 1 can be thickened (the cross-sectional area can be increased) accordingly. In other words, the balloon catheter 1 can be inserted into the valve 13 even when the outer diameter of the balloon catheter 1 is increased (thickened) by an amount corresponding to the reduction in the cross-sectional area of the distal end portion 81. On the other hand, since the proximal end portion 82 of the catheter inserter 8 covers the entire outer periphery of the balloon catheter 1, the balloon catheter 1 is reliably held by the catheter inserter 8. Note that this effect can be achieved by any catheter not limited to the balloon catheter 1.

Next, the operation during insertion and removal of the balloon catheter 1 and the catheter inserter 8 will be described with reference to FIG. 6.

At the time of insertion of the balloon catheter 1, as illustrated in FIG. 6, the balloon catheter 1 and the catheter inserter 8 are integrally inserted into the valve 13 of the endoscope 10 in a state where the elastic band 4 is supported by the restrained member support structure 83 and the proximal end support portion 84. In particular, when the elastic band 4 passes through the valve 13, the restrained member support structure 83 covering the outer periphery of the elastic band 4 reduces a contact between the insertion opening of the valve 13 and the elastic band 4. In addition, even when the elastic band 4 receives force from the valve 13 toward the proximal end side when passing through the insertion opening of the valve 13, the elastic band 4 is supported from the proximal end side by the proximal end support portion 84 and thus is effectively suppressed from being dislocated in the axial direction. In addition, as illustrated in FIG. 6, in the case of a configuration where the projection 52 is supported from the proximal end side by the projection support portion 86 even at the time of insertion, the entire balloon catheter 1 is effectively suppressed from being dislocated in the axial direction with respect to the catheter inserter 8.

As illustrated in FIG. 6, the elastic band 4 passes through the valve 13 toward the distal end side and then the valve 13 passes the projecting valve holding structure 85 toward the proximal end side; thereafter, the valve 13 is held in a limited axial range between the valve holding structure 85 and the projection support portion 86. In other words, a relative axial movement of the catheter inserter 8 and the endoscope 10 is limited by the axial range. Afterward, when the shaft 2 of the balloon catheter 1 is fed toward the distal end side, the catheter inserter 8 does not substantially move in the axial direction, and only the balloon catheter 1 moves in the axial direction (toward the distal end side) as described above with reference to FIG. 1. After completion of the insertion of the balloon catheter 1 as described above (or after the elastic band 4 passes through the valve 13), only the catheter inserter 8 may be pulled from the valve 13 toward the proximal end side, or the catheter inserter 8 may be maintained in the state illustrated in FIG. 6 for removal described next.

At the time of removal of the balloon catheter 1, the shaft 2 of the balloon catheter 1 is pulled out toward the proximal end side to return to the state illustrated in FIG. 6. At this time, the proximal end portion of the projection 52 of the balloon catheter 1 comes into contact with the stepped projection support portion 86. In addition, the proximal end portion of the elastic band 4 returned to the deflated state together with the balloon 3 may also come into contact with the stepped proximal end support portion 84. When the shaft 2 is further pulled out toward the proximal end side from this state, the catheter inserter 8 is also pulled out toward the proximal end side integrally with the balloon catheter 1 by the engagement between the projection 52 and the projection support portion 86. Therefore, the projecting valve holding structure 85 of the catheter inserter 8 can pass over the valve 13 of the endoscope 10 toward the proximal end side. As described above, the balloon catheter 1 and the catheter inserter 8 are integrally removed from the valve 13 of the endoscope 10 while being maintained in the state illustrated in FIG. 6 in the same manner as that at the time of insertion.

The disclosure has been described above based on the embodiments. It is obvious to those skilled in the art that various modifications can be made to the combination of the components and processes in the exemplary embodiments and that such modifications are included in the scope of the disclosure.

Figure 7:
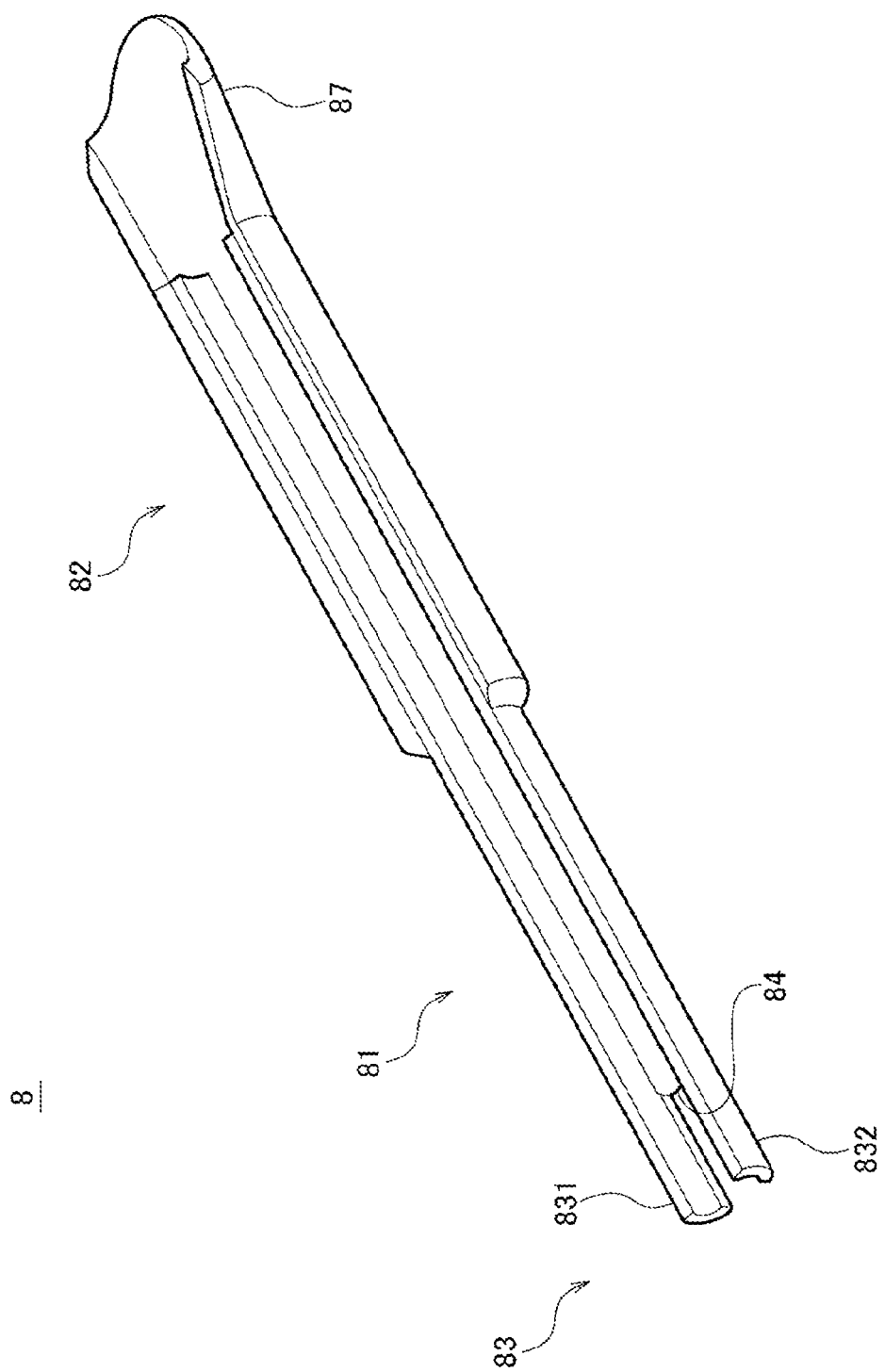
FIG. 7 illustrates a modified example of the catheter inserter.

FIG. 7 illustrates a modified example of the catheter inserter 8. The same components as those of the catheter inserter 8 in FIG. 5 are denoted by the same reference numerals, and redundant descriptions will be omitted. In the catheter inserter 8, not only the distal end portion 81 but also the proximal end portion 82 covers a portion of the outer periphery of the balloon catheter 1 (not illustrated in FIG. 7). Therefore, substantially half of the outer periphery (upper half or northern hemisphere) is open over the entire length in the insertion direction of the catheter inserter 8. Unlike the catheter inserter 8 in FIG. 5, in which the proximal end portion 82 has a fully tubular shape, the balloon catheter 1 does not need to be inserted in the axial direction from the proximal end of the catheter inserter 8, but is mounted in the radial direction from the open northern hemisphere side of the catheter inserter 8. As described above, according to the catheter inserter 8 of the present modified example, the balloon catheter 1 can be easily attached and detached from the northern hemisphere side. Further, an expanded portion 87 with the inner diameter increasing toward the proximal end is formed at the proximal end portion 82 of the catheter inserter 8 of the present modified example. As a result, the attachability or detachability of the balloon catheter 1 at the proximal end portion 82 is improved.

Further, the restrained member support structure 83 of the catheter inserter 8 of the present modified example includes a plurality of clamping portions 831, 832 that clamp a plurality of opposing outer peripheral portions of the restrained member such as the elastic band 4. Further, on the southern hemisphere side between the proximal end portions of the plurality of clamping portions 831 and 832, a proximal end support portion 84 that supports the proximal end portion of the elastic band 4 from the proximal end side is provided in the same way as the proximal end support portion 84 of the catheter inserter 8 in FIG. 5. In other words, when viewed along the insertion direction, the two clamping portions 831 and 832 are provided on both sides of the proximal end support portion 84 provided on the lower portion (the south pole portion). When the balloon catheter 1 and the catheter inserter 8 are integrally inserted into the valve 13 of the endoscope 10 as illustrated in FIG. 6, the two opposing outer peripheral portions of the elastic band 4 are reliably supported by the two clamping portions 831 and 832, and the proximal end portion of the elastic band 4 is reliably supported by the proximal end support portion 84.

Note that the configuration, action, and function of each device and each method described in the embodiments can be implemented by hardware resources, software resources or in cooperation of hardware resources and software resources. For example, processors, ROMs, RAMs, and various integrated circuits can be used as the hardware resources. For example, programs such as operating systems and applications can be used as the software resources.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A catheter inserter configured to insert a catheter into an insertion opening of an endoscope provided with a valve, the catheter comprising:

a balloon attached on a distal end side of a shaft and configured to be expanded by a fluid supplied from a proximal end side of the shaft; and a restrained member wound around an outer periphery of an intermediate portion between a distal end portion and a proximal end portion of the balloon and configured to limit expansion of the balloon at the intermediate portion, wherein the catheter inserter includes, on a distal end side of the catheter inserter, a restrained member support structure configured to support at least a portion of an outer periphery of the restrained member;

wherein the restrained member support structure includes a plurality of clamping portions configured to clamp the outer periphery of the restrained member.

2. The catheter inserter according to claim 1, wherein a proximal end support portion configured to support a proximal end portion of the restrained member from a proximal end side is provided at a proximal end portion of the restrained member support structure.

3. The catheter inserter according to claim 2, wherein the proximal end support portion is provided on both sides in a circumferential direction of the restrained member support structure when viewed along an insertion direction.

4. The catheter inserter according to claim 1, wherein a projection is provided at a proximal end side of the balloon and coupled with a surface of the shaft, and a projection support portion configured to support the projection at a proximal end side of the catheter inserter, when the restrained member is supported by the restrained member support structure is provided on a proximal end side from the restrained member support structure.

5. The catheter inserter according to claim 4, wherein a portion of the projection support portion and a portion of the restrained member support structure are provided at circumferential positions opposite to each other when viewed along an insertion direction.

6. The catheter inserter according to claim 4, wherein the catheter inserter is configured to cover a portion of an outer periphery of the catheter on a distal end side from the projection support portion, and cover an entire outer periphery of the catheter on a proximal end side from the projection support portion.

7. The catheter inserter according to claim 4, further comprising a valve holding structure that is provided on a distal end side from the projection support portion and configured to hold the valve in a range between the projection support portion and the valve holding structure.

8. A catheter inserter configured to insert a catheter into an insertion opening of an endoscope provided with a valve, wherein the catheter inserter covers only a portion of an outer periphery of the catheter on a distal end side of the catheter inserter and covers an entire outer periphery of the catheter on a proximal end side of the catheter inserter.

9. A catheter device, comprising:

a catheter including a balloon attached on a distal end side of a shaft and configured to be expanded by a fluid supplied from a proximal end side of the shaft, and a restrained member wound around an outer periphery of an intermediate portion between a distal end portion and a proximal end portion of the balloon and configured to limit expansion of the balloon at the intermediate portion; and a catheter inserter configured to insert the catheter into an insertion opening of an endoscope provided with a valve, wherein the catheter inserter covers, on a distal end side of the catheter inserter, a portion of an outer periphery of the catheter and including a restrained member support structure configured to support a portion of an outer periphery of the restrained member;

wherein the restrained member support structure includes a plurality of clamping portions configured to clamp the outer periphery of the restrained member.

10. The catheter device according to claim 9, wherein a projection is provided at a proximal end side of the balloon and coupled with a surface of the shaft, and a projection support portion configured to support the projection at a proximal end side of the catheter inserter, when the restrained member is supported by the restrained member support structure is provided on a proximal end side from the restrained member support structure in the catheter inserter.

* * * * *